3,518,101
CATIONIC ASPHALT EMULSIONS
Felix C. Gzemski, Glen Mills, and Robert C. Taylor, King of Prussia, Pa., assignors to Atlantic Richfield Company, Philadelphia, Pa., a corporation of Pennsylvania
No Drawing. Filed May 23, 1967, Ser. No. 640,470
Int. Cl. C08h 13/00; C08k 1/62; C09d 3/24
U.S. Cl. 106—277                        4 Claims

ABSTRACT OF THE DISCLOSURE

Aqueous asphalt emulsions of the cationic type prepared by using as an emulsifying agent a salt of an amine with a polybasic acid.

This invention relates to emulsions of asphalt in water which are useful for coating aggregate in the construction of roads and the like. More particularly, the invention is directed to aqueous asphalt emulsions of the cationic type, which typically are useful for coating a wide range of aggregates differing substantially in their electrochemical surface properties. The invention specifically is directed to the novel use of suitable amine salts of certain polybasic acids as emulsifying agents in preparing cationic aqueous asphalt emulsions having improved aggregate-coating ability, and to the new and improved asphalt emulsions so provided.

BACKGROUND OF THE INVENTION

The use of aqueous emulsions of asphalt as a binder to coat loose aggregate, such as stone, gravel and the like, in the construction and surfacing of roads is well known. Such aqueous asphalt emulsions include those of the anionic and cationic types. Emulsions of the cationic type previously known are generally superior to those of the anionic type in their ability to coat satisfactorily a wider range of electronegative aggregates, such as silica and quartz, and electropositive aggregates, such as limestone. Mixes made with cationic emulsions are often less damaged by rainfall immediately after they are laid than those made with anionic emulsions. Thus, cationic emulsions can be used under more adverse curing conditions than anionic emulsions. Moreover, cationic emulsions will generally cure more quickly at low temperatures than anionic emulsions. The present invention is directed to providing an improvement in aqueous asphalt emulsions of the cationic type.

Aqueous asphalt emulsions of the cationic type heretofore have been prepared with the aid of emulsifying agents consisting of a salt of a suitable amine with a monobasic acid such as hydrochloric, sulfuric and acetic. While emulsions prepared with such conventional emulsifying agents generally are useful, it has been found that they are not satisfactory for the coating of aggregates which are essentially electropositive, such as limestones and dolomites.

SUMMARY OF THE INVENTION

In view of the above, a principal object of the present invention is to provide novel aqueous asphalt emulsions of the cationic type which are superior to those heretofore available in their ability to satisfactorily coat essentially electropositive aggregates. Another principal object of the present invention is to provide novel emulsifying agents, consisting of the salts of suitable amines with certain polybasic acids, having usefulness in the preparation of cationic aqueous asphalt emulsions exhibiting superior coating ability for both electronegative and electropositive aggregates as well as aggregates that bear both types of surface charges, such as basalts, porphyries and trap rock. These and other objects and benefits of the present invention will become more readily apparent from a reading of the following detailed description.

It now has been found that aqueous asphalt emulsions of the cationic type, exhibiting superior ability for coating aggregates and particularly electropositive aggregates such as limestones and dolomites, can be prepared through the use of an emulsifying agent consisting of the salt of a suitable amine or amine-type compound with a selected polybasic acid. Emulsions produced through the use of amine salts of polybasic acids have been shown to be markedly and unexpectedly superior to analogous emulsions prepared through the use of the corresponding amine salts of monobasic acids.

PREFERRED EMBODIMENTS

In preparing the amine salts of polybasic acids suitable for use in accordance with the present invention, a wide variety of amines can be employed. In general, any relatively high molecular weight amine or amine-type compound whose salt with a selected polybasic acid will act as an emulsifier and is sufficiently soluble in water can be employed in accordance with the present invention. These amines or amine-type compounds generally contain an alkyl group having twelve (12) to twenty-two (22) carbon atoms. However, it should be noted that not all of the amines and amine-type compounds heretofore commonly used in the preparation of emulsifying salts with monobasic acids can be used for the preparation of suitable salts with polybasic acids. This is for the reason that many of the salts formed by such conventional amines and amine-type compounds with polybasic acids would not be sufficiently soluble in water for satisfactory use. Accordingly, this invention contemplates the use of only such amines and amine-type compounds heretofore employed as will produce salts with polybasic acids exhibiting at least 10 wt. percent solubility in water at room temperature.

Subject to the above-mentioned limitations, the amine or amine-type compound may be a monoamine, a polyamine, and particularly a diamine, a quaternary ammonium compound, or a mixture of such amine or amine-type compounds. The amines which have been found to be most effective and which, therefore, are preferred in the practice of the present invention, are diamines represented by the following formula:

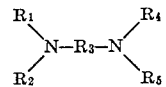

wherein $R_1$ is an alkyl radical containing from about twelve (12) to about twenty-two (22) carbon atoms; $R_2$, $R_4$ and $R_5$ are each selected from the group consisting of a hydrogen atom, an alkyl radical containing not more than about four (4) carbon atoms and an alkoxy radical containing not more than about four (4) carbon atoms and an alkoxy radical containing not more than about four (4) carbon atoms, or a polyalkoxy radical of an alkylene oxide containing not more than four (4) carbon atoms; and $R_3$ is an alkylene radical containing not more than about four (4) carbon atoms. Quaternary ammonium compounds having not less than one (1) alkyl substituent group containing from about twelve (12) to about twenty-two (22) carbon atoms also give satisfactory results and can be employed. Examples of amines and amine-type compounds which are suitable for use in the practice of the present invention include, but are not limited to:

Monoamines lauryl amine
stearyl amine
oleyl amine

Polyamines

N-octadecyl-1,3-propylene diamine
N-hexadecyl-1,3-propylene diamine
N-lauryl-1,2-ethylene diamine Quaternary ammonium compounds lauryl trimethyl ammonium chloride
octadecyltrimethyl ammonium chloride
cetyl trimethyl ammonium bromide
dioctyl dimethyl ammonium chloride Ethoxylated amines

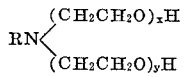

in which the source of the alkyl radical can be coco amine, soybean amine, tallow amine and stearyl amine; the average molecular weight is 285 to 2470 and where the moles of ethylene oxide $(x+y)$ are equal to 2 to 50.

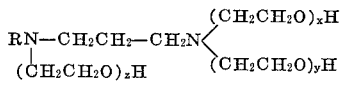

in which the source of the alkyl radical can be tallow amine; the average molecular weight is 500 to 860 and where the moles of ethylene oxide $(x+y+z)$ are equal to 3 to 10.

Certain commercially-available amines and amine-type products are particularly suitable for use. These include, for example, N-alkyl trimethylene diamines and diamine-type cationic surfactants products manufactured and sold by Armour and Company under the trademarks "Duomeen T," "Ethoduomeen T–12," "Ethoduomeen T–13" and "Ethoduomeen T–20." Similarly, the quaternary ammonium compound, $C_{14}$ alkyl trimethyl ammonium chloride, currently marketed by Armour and Company under the trademark "Arquad T–50," can be employed.

The emulsifying agents of the present invention consist of salts of the foregoing amines and amine-type compounds with selected polybasic acids. Polybasic acids which can be so used should have a dissociation constant for the first hydrogen atom ($K_1$) falling within the range of from about $1 \times 10^{-1}$ to about $1 \times 10^{-7}$, and a dissociation constant for the second hydrogen atom ($K_2$) of not more than about $1 \times 10^{-3}$. Within these limitations, almost any polybasic acid or mixture of polybasic acids can be employed; for example, polybasic acids suitable for use in accordance with the present invention include, but are not limited to, inorganic acids such as orthophosphoric acid ($H_3PO_4$), phosphorus acid ($H_3PO_3$) and arsenic acid ($H_3AsO_4$); saturated aliphatic dicarboxylic acids such as oxalic acid (ethanedioic acid), malonic acid (propanedioic acid), succinic acid (butanedioic acid), glutaric acid (pentanedioic acid); substituted saturated aliphatic dicarboxylic acids such as tartaric acid and malic acid (hydroxysuccinic acid); saturated aliphatic tricarboxylic acid (substituted and unsubstituted) such as citric acid; and unsaturated aliphatic acids such as maleic and fumaric acids. The use of orthophosphoric acid, oxalic acid, tartaric acid or citric acid has been found to give excellent results, and these acids are preferred in the practice of the present invention.

In preparing the salt of the amine or amine-type compound with a selected polybasic acid, the acid is utilized in an amount equivalent to from about 0.5 to about 2.0 mols, and preferably from about 0.7 to about 1.1 mols, per atom of nitrogen present in the amine or amine-type compound which is employed.

In preparing the improved aqueous asphalt emulsions of the present invention, it is convenient to prepare the novel emulsifying agents in situ. Thus, the amine or amine-type compound may be dissolved in the asphalt phase with the aid of agitation and heat, while the acid may be dissolved in the aqueous phase. When the two phases are brought together and intimately contacted, such as through the use of a mixing device capable of producing a vigorous shearing action, the amine salt of the polybasic acid is produced simultaneously. It has been found preferable, however, for the acid first to be dispersed in the aqueous phase and for the amine then to be added to the same phase.

In accordance with the preferred practice described above, the amine or amine-type compound is added to water in an amount necessary to produce an aqueous phase containing from about 0.1 to about 5.0, and preferably from about 0.5 to about 2.0, percent by weight of the amine or amine-type compound. The relative proportions of acid and the amine or amine-type compound remain as stated hereinbefore. According to this preferred practice, an emulsifying solution consisting essentially of the amine salt of the polybasic acid in water is produced. The emulsifying solution, with or without the addition of other conventional additives, then can be utilized to prepare the improved asphalt emulsions of the invention.

In preparing the improved asphalt emulsions in accordance with the preferred practice of the present invention, an aqueous emulsifying solution, prepared as above described, is intimately contacted with a suitable petroleum-derived asphalt by a mixing device, such as a colloid mill, which is capable of producing a vigorous shearing action. The ultimate asphalt content of the emulsion commonly can fall in the range of from about 30 to about 80 percent by weight of the emulsion, but preferably should fall in the range of from about 60 to about 75 percent by weight. The production, selection and properties of suitable petroleum-derived asphalts for use in accordance with the present invention are commonly known and are described in the public literature.

As noted above, other additives commonly used in aqueous asphalt emulsions also can be employed in the practice of the present invention. For example, an inorganic salt such as calcium chloride or sodium sulfate can be added to the ultimate asphalt emulsion in an amount up to about 2 percent by weight, in order to prolong the emulsion stability and improve storage stability.

In order to illustrate specific embodiments and benefits of the present invention, aqueous emulsifier, or emulsifying, solutions were prepared from the commercially-available diamine marketed by Armour and Company and known under the trademark "Ethoduomeen T–12" (the reaction product of an amine and ethylene oxide having the general formula

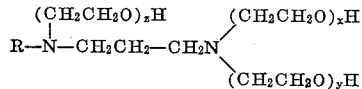

where the source of the alkyl radical is tallow amine and the specific gravity (25°/25° C.) is $\angle 1$), and various monobasic and polybasic acids. In each case, the acid and the amine or amine-type compound were employed in the relative proportions of approximately 1 mol of the acid for each atom of nitrogen in the amine or amine-type compound. The emulsifying solution was prepared by bringing together the amine or amine-type compound and the selected acid in the presence of water, the amine or amine-type compound being employed in an amount equivalent to approximately 0.75 percent by weight of the ultimate aqueous solution. The various emulsifying solutions so produced were contacted with a petroleum-derived asphalt having a penetration (ASTM D–5) of from about 150 to about 200 at 77° F., a specific gravity of 1 to 1.03, a softening point of 95 to 115° F. (ASTM D36–62T), a viscosity of 1 to 3 poises (at 275° F.), an acid number of 0 to 2 and a salt content of 0 to 0.015%. In all cases, the asphalt constituted approximately 2 parts by weight, and the emulsifying solution approximately 1 part by weight, of the final aqueous emulsion. The contacting was performed in a high-shear colloid mill. The emulsifying solution was supplied at a temperature of 100° F., the asphalt at 300° F., thereby producing a mixture of approximately 200° F. The results presented in the following table demonstrate the unexpected superiority of the emulsions prepared with the polybasic acids of the present invention to coat an electro-positive aggregate, such as Virginia Shady Dolomite, over those identically prepared except for the use of monobasic acids, such as sulfuric acid, which do not come within the scope of the present invention.

TABLE I

| Acid | Stone coating ability, percent coated | |
|---|---|---|
| | Pennsylvania sandstone | Virginia shady dolomite |
| Acetic | 90 | 50 |
| Hydrochloric | 95 | 70 |
| Sulfuric | 90 | 75 |
| Orthophosphoric | 95 | 92 |
| Oxalic | 90 | 95 |
| Tartaric | 97 | 95 |
| Citric | 95 | 85 |

When other emulsifying agents are prepared with the amines or amine-type compounds and the polybasic acids herein described, substantially equivalent results are obtained.

Since the coating test employed in Table I has provided excellent correlation of emulsion performance results at the laboratory, plant and field application levels, it is described in detail below.

(A) The apparatus and materials for the stone coating test are the same as that for ASTM Coating Test D244–49.

(B) To a pan with a spatula, the tare weight of which has previously been determined, exactly 465 grams of wet graded aggregate is added (2% water is added to dried aggregate for this test).

(C) Exactly 35 grams of emulsion is then weighed into the aggregate in the pan and mixed vigorously for two minutes. During mixing, it is noted whether or not the emulsion is stripped from the aggregate. As stripping occurs, the time from the start of mixing until stripping begins is noted and the percent of stripped area is noted at the end of the two-minute mixing period.

(D) The mixture is then set aside in the pan for 30 minutes at room temperature. One edge of the pan is rested at elevation of 1 inch to facilitate drainage.

(E) After curing and without remixing, the emulsion runoff is carefully and completely drained from the mixture in the pan into a 3-ounce ointment tin of known weight. This runoff is weighed and recorded as grams runoff.

(F) The residue of the runoff is determined using an electric hotplate. Loss of asphalt should not exceed 10%.

(G) After draining the runoff, the mixture in the pan is drenched with cold tap water until the overflow water runs clear. Excess water is drained off, and the mixture is dumped onto adsorbent paper for evaluation.

(H) The mixture is then evaluated immediately by visual estimation of the percent of total aggregate surface area which is coated with asphalt.

Although the foregoing illustrates several specific embodiments of the present invention, other embodiments and applications of this invention will be obvious to those skilled in the art. It is to be specifically understood that all such applications and embodiments are contemplated as coming within the scope of the present invention.

The invention claimed is:

1. An emulsion of asphalt in water, suitable for coating aggregate, said emulsion comprising: (A) water, (B) asphalt, and (C) an emulsifying agent consisting essentially of an emulsion-producing amount of water soluble, emulsion producing salt of a polybasic acid selected from the group consisting of oxalic acid, tartaric acid, and citric acid, with an organic diamine represented by the formula

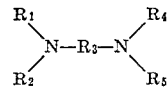

wherein $R_1$ is an alkyl radical containing from about twelve to about twenty-two carbon atoms, $R_3$ is an alkylene radical containing not more than about four carbon atoms, and $R_2$, $R_4$ and $R_5$ are each selected from the group consisting of a hydrogen atom, an alkyl radical containing not more than about four carbon atoms, an alkoxy radical containing not more than about four carbon atoms, and a polyalkoxy radical of an alkylene oxide containing not more than four carbon atoms, wherein 0.5 to 2.0 moles of the acid are present per nitrogen atom of the diamine, and wherein the salt produced by the said diamine and the said acid exhibits a solubility of at least 10 weight percent solubility in water at room temperature, and wherein said salt is utilized in the emulsion in an amount of from about 0.1 to about 5.0 percent by weight of the diamine with respect to the water and wherein the asphalt content of the emulsion is about 30 to about 80 percent by weight of the emulsion.

2. An emulsion according to claim 1 wherein said polybasic acid is oxalic acid.

3. An emulsion according to claim 1 wherein said polybasic acid is tartaric acid.

4. An emulsion according to claim 1 wherein said polybasic acid is citric acid.

References Cited

UNITED STATES PATENTS

| 2,759,975 | 8/1956 | Chiddix et al. | 252—357 XR |
| 2,876,263 | 3/1959 | Mark | 252—357 XR |
| 3,359,738 | 12/1967 | Dybalski et al. | 106—277 XR |

JULIUS FROME, Primary Examiner

J. B. EVANS, Assistant Examiner

U.S. Cl. X.R.

94—20, 23; 106—280, 283; 252—311.5